(12) United States Patent
Zheng

(10) Patent No.: US 10,067,285 B1
(45) Date of Patent: Sep. 4, 2018

(54) STONE SLAB WITH LIGHT SOURCE AND MANUFACTURING PROCESS THEREOF

(71) Applicant: Nan'an Besttime Stone Co., Ltd, Xiamen (CN)

(72) Inventor: Huizhang Zheng, Quanzhou (CN)

( * ) Notice: Subject to any disclaimer, the term of this patent is extended or adjusted under 35 U.S.C. 154(b) by 0 days.

(21) Appl. No.: 15/876,155

(22) Filed: Jan. 21, 2018

(30) Foreign Application Priority Data

Mar. 2, 2017 (CN) .......................... 2017 1 0121157

(51) Int. Cl.
| | |
|---|---|
| G02B 6/00 | (2006.01) |
| F21V 8/00 | (2006.01) |
| F21S 9/02 | (2006.01) |
| E04F 13/077 | (2006.01) |
| E04F 15/08 | (2006.01) |
| E04F 13/14 | (2006.01) |
| E04F 13/074 | (2006.01) |
| F21Y 115/10 | (2016.01) |
| F21Y 103/10 | (2016.01) |

(52) U.S. Cl.
CPC .......... *G02B 6/0088* (2013.01); *E04F 13/074* (2013.01); *E04F 13/077* (2013.01); *E04F 13/144* (2013.01); *E04F 15/082* (2013.01); *F21S 9/02* (2013.01); *G02B 6/0083* (2013.01); *G02B 6/0091* (2013.01); *G02B 6/0093* (2013.01); *E04F 2290/026* (2013.01); *F21Y 2103/10* (2016.08); *F21Y 2115/10* (2016.08)

(58) Field of Classification Search
CPC .. G02B 6/0088; G02B 6/0083; G02B 6/0091; G02B 6/0093; E04F 13/074; E04F 13/077; E04F 13/144; E04F 15/082; F21S 9/02

USPC ........................................................ 362/612
See application file for complete search history.

(56) References Cited

FOREIGN PATENT DOCUMENTS

| | | | |
|---|---|---|---|
| CN | 2721388 Y | | 8/2005 |
| CN | 102615863 A | | 8/2012 |
| CN | 202627382 U | * | 12/2012 |
| CN | 106273816 A | | 1/2017 |
| CN | 206571089 U | | 10/2017 |
| JP | 2005059342 A | | 3/2005 |

* cited by examiner

*Primary Examiner* — Andrew Coughlin
*Assistant Examiner* — Meghan Ulanday
(74) *Attorney, Agent, or Firm* — Wayne & Ken, LLC; Tony Hom

(57) ABSTRACT

A stone slab with a light source and a manufacturing process thereof are disclosed. The stone slab includes a transparent composite plate. The composite plate includes a stone panel, a light guide plate, and a honeycomb plate laminated from top to bottom. A water-molecule-activated protective film is provided on an upper surface and a lower surface of the light guide plate respectively. The water-molecule-activated protective film on the upper surface of the light guide plate is bonded to the stone panel. The water-molecule-activated protective film on the lower surface of the light guide plate is bonded to the honeycomb plate by using an adhesive. The water-molecule-activated protective film can be used to bond the light guide plate. Moreover, the adhesive on another side of the water-molecule-activated protective film does not directly contact the light guide plate and avoids a problem that a lighting effect is impaired.

9 Claims, 5 Drawing Sheets

US 10,067,285 B1

STONE SLAB WITH LIGHT SOURCE AND MANUFACTURING PROCESS THEREOF

TECHNICAL FIELD

The present invention relates to a stone slab and a manufacturing process thereof, and in particular, to a stone slab with a light source and a manufacturing process thereof.

BACKGROUND

A conventional decorative wall such as a light-emitting background wall or a floor tile generally includes a composite plate and a backlight source. The composite plate is formed by bonding a natural stone material to a glass plate. The composite plate is heavy, and needs to be erected and fixed by setting up a support frame using a plurality of steel bars and structural parts at the back of the composite plate; then a plurality of fluorescent lamps are arranged on the support frame to form a backlight source to illuminate the composite plate; after light is transparently transmitted through the natural stone material, a particular stone image is formed on a front face of the natural stone, and there is a good decorative effect.

A Chinese patent application of the applicant, entitled "STONE MATERIAL FOR COMPOSITE LIGHT GUIDE PLATE" (application No. 201611215826.5), a composite plate and a backlight source are disclosed. The composite plate includes a stone panel, a light guide plate, and a honeycomb plate that are bonded in sequence. The stone panel is bonded to the light guide plate by using a light-cured UV glue. The light guide plate is bonded to the honeycomb plate by using an epoxy resin AB glue.

There are light guide points of various sizes and various densities on the light guide plate. When light is emitted to each light guide point, reflected light is dispersed in various directions. Then a reflection condition is destroyed, and light is emitted from a front face of the light guide plate. Because front and back faces of the light guide plate are respectively bonded to the stone panel and the honeycomb plate by using a liquid glue, when the liquid glue is used as an adhesive, the liquid glue may enter a light guide point. Consequently, the light guide point is blocked, and light cannot be emitted. Finally, a light guide effect is impaired, and a lighting effect on the stone panel is poor.

SUMMARY

The present invention provides a stone slab with a light source and a manufacturing process thereof mainly to overcome a disadvantage of the prior art that a light guide effect is impaired because a light guide plate is affected by a liquid adhesive when being bonded.

To solve the foregoing technical problem, the present invention uses the following technical solutions:

A stone slab with a light source includes a transparent composite plate, where the composite plate includes a stone panel, a light guide plate, and a honeycomb plate that are laminated from top to bottom, a water-molecule-activated protective film is provided on an upper surface and a lower surface of the light guide plate respectively, the water-molecule-activated protective film on the upper surface of the light guide plate is bonded to the stone panel by using an adhesive, and the water-molecule-activated protective film on the lower surface of the light guide plate is bonded to the honeycomb plate by using an adhesive.

Further, a concave installation housing is clamped to each lateral side of the composite plate, and every two adjacent concave installation housings are fixed by using a connecting assembly.

Further, the connecting assembly includes two integrated fixing plates, a bending angle exists between the two fixing plates, and the two fixing plates are respectively locked to two adjacent concave installation housings by using bolts.

Further, two ears disposed opposite to each other are provided on one side of the concave installation housing away from the composite plate, and the fixing plate capable of sliding is embedded between the concave installation housing and the ears.

Further, the water-molecule-activated protective film includes a PET film and a water-molecule-activated adhesive, and the PET film is bonded to the light guide plate by using the water-molecule-activated adhesive.

Further, the light guide plate is a 1.8 m×3.0 m special fiberglass light guide plate.

Further, a strip slot is provided on an internal surface of one side of the concave installation housing facing the composite plate, an LED strip capable of emitting light into the light guide plate is installed in the strip slot, and the LED strip is electrically connected to a 12V or 24V rechargeable lithium battery.

Further, the stone panel is a mosaic combination of more than one or two of natural granite, marble, sandstone, semi-precious stone, and quartzite.

Further, the honeycomb plate is an aluminum product, a PVC product, or an acrylic product.

A process for manufacturing a stone slab with a light source includes the following steps:

(1) synthesis of a composite plate: fetching a light guide plate, and bonding a water-molecule-activated protective film to an upper surface and a lower surface of the light guide plate in a water-molecule-activated manner respectively; fetching a stone panel, and bonding the stone panel to the water-molecule-activated protective film on the upper surface of the light guide plate by using an adhesive; and fetching a honeycomb plate, and bonding the honeycomb plate to the water-molecule-activated protective film on the lower surface of the light guide plate by using an adhesive;

(2) polishing a surface of the stone panel in the composite plate by using a stone mill with automatic pneumatic pressure control;

(3) polishing edges of the light guide plate in the composite plate by using a dedicated polishing machine, until the edges are transparent;

(4) clamping a concave installation housing to each lateral side of the composite plate, and installing an LED strip and a rechargeable lithium battery electrically connected to the LED strip in a strip slot that is provided on an internal surface of one side of the concave installation housing facing the composite plate;

(5) fixedly connecting every two adjacent concave installation housings by using a connecting assembly; and (6) performing drilling from a lower surface of the composite plate by using an alloy bit, penetrating the honeycomb plate and the water-molecule-activated protective film in sequence, and reaching the light guide plate to form an embedded hole; and then embedding a back-bolt expansion screw in the embedded hole, and mounting an ear assembly onto the back-bolt expansion screw.

In comparison with the prior art, the present invention brings about the following beneficial effects:

1. The present invention has a simple structure and high applicability. A water-molecule-activated protective film is provided between the light guide plate and the stone panel and between the light guide plate and the honeycomb plate. Because the water-molecule-activated protective film is in a solid state, it can be used to bond the light guide plate. Moreover, the adhesive on another side of the water-molecule-activated protective film is separated by the water-molecule-activated protective film and does not directly contact the light guide plate. This avoids a problem that a lighting effect is impaired because an adhesive enters a light guide point in a light guide plate during bonding in the prior art.

2. In the present invention, the connecting assembly is disposed to fix two adjacent concave installation housings, so that stability of the overall structure of the present invention is improved. In addition, the ears disposed opposite to each other on the concave installation housing can guide the fixing plate and facilitate dismounting, and can further improve the stability of the overall structure.

3. A size of the special fiberglass light guide plate used in the present invention is greater than 1.2 m×2.4 m generally used in the market. This can facilitate later processing and cutting.

DESCRIPTION OF EMBODIMENTS

Figure 1:
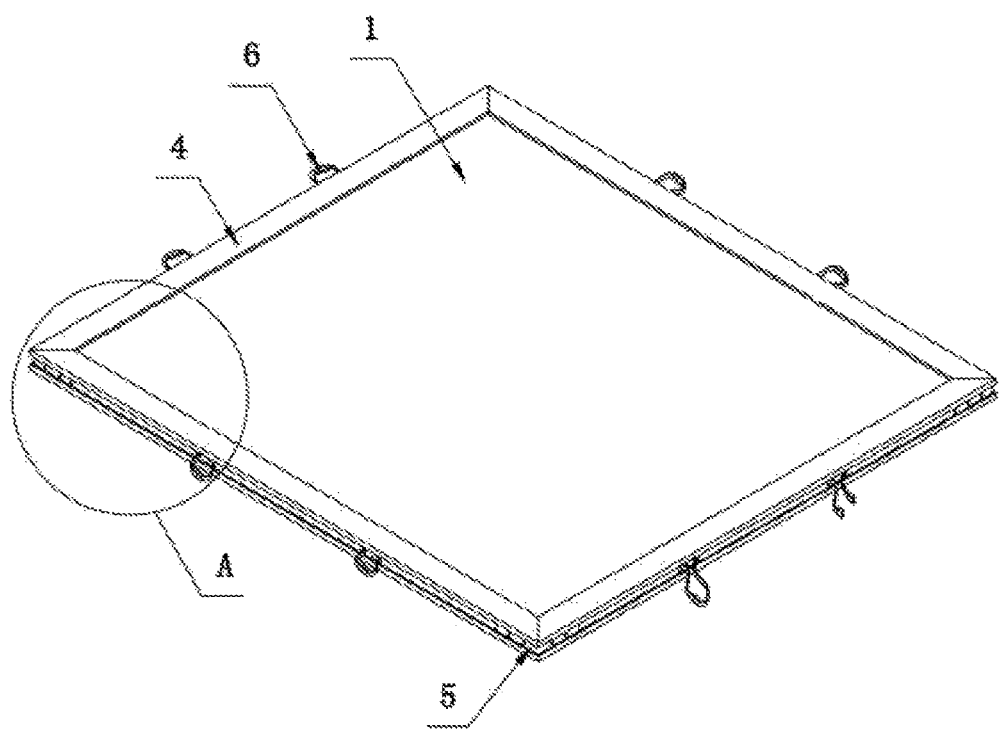
FIG. 1 is a schematic view of a structure of the present invention.
Figure 2:
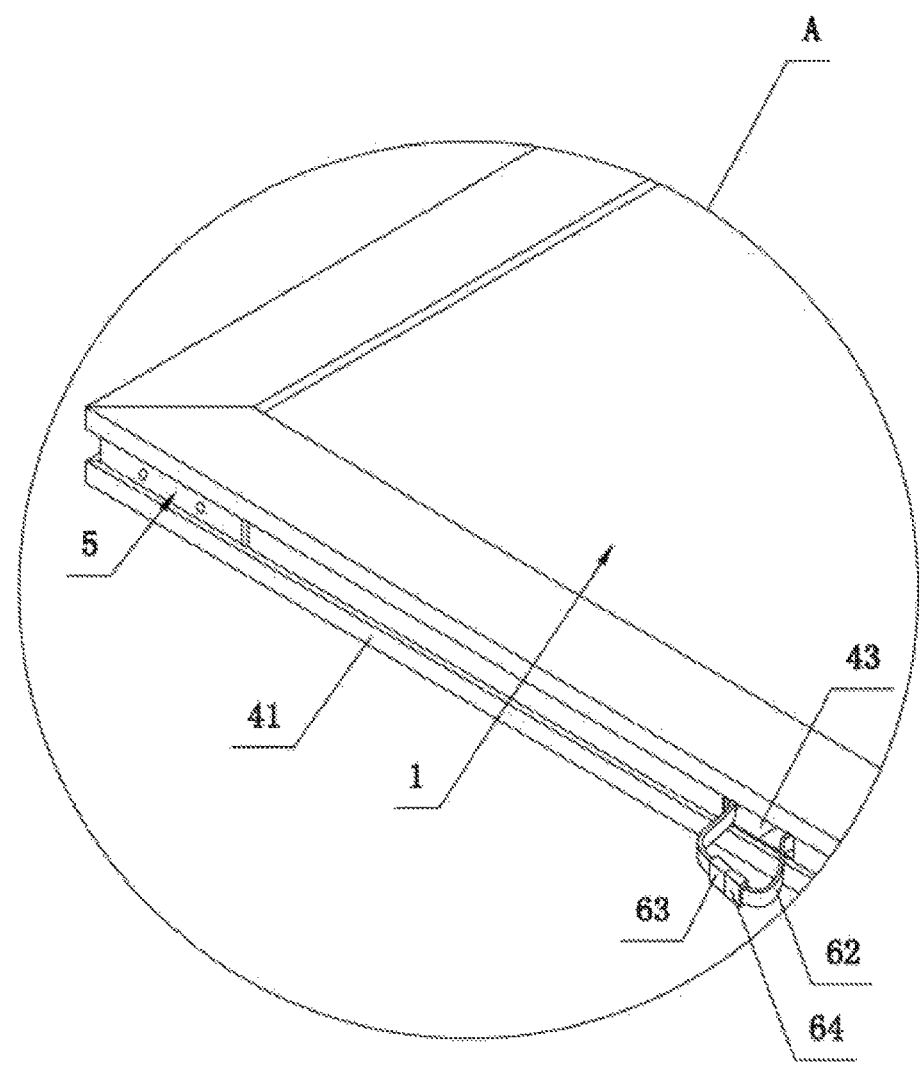
FIG. 2 is a schematic view of magnified A in FIG. 1.

The following describes specific embodiments of the present invention with reference to accompanying drawings.

Referring to FIG. 1, FIG. 2, FIG. 3, FIG. 4, and FIG. 5, a stone slab with a light source includes a transparent composite plate 1, where the composite plate 1 includes a stone panel 11, a light guide plate 12, and a honeycomb plate 13 that are laminated from top to bottom, a water-molecule-activated protective film 2 is provided on an upper surface and a lower surface of the light guide plate 12 respectively, the water-molecule-activated protective film on the upper surface of the light guide plate 12 is bonded to the stone panel 11 by using an adhesive 3, and the water-molecule-activated protective film on the lower surface of the light guide plate is bonded to the honeycomb plate 13 by using an adhesive 3. A water-molecule-activated protective film 2 is provided between the light guide plate 12 and the stone panel 11 and between the light guide plate 12 and the honeycomb plate 13. Because the water-molecule-activated protective film 2 is in a solid state, it can be used to bond the light guide plate 12. Moreover, the adhesive 3 on another side of the water-molecule-activated protective film is separated by the water-molecule-activated protective film and does not directly contact the light guide plate 12. This avoids a problem that a lighting effect is impaired because an adhesive enters a light guide point in a light guide plate during bonding in the prior art.

Specifically, in the present invention, the adhesives for bonding the stone panel and the honeycomb plate are both highly transparent epoxy resin glues. The epoxy resin glues have low toxicity and low volatility. Featuring wide proportioning and easy operations, the epoxy resin glues can be cured at a normal temperature, and have high adhesive strength, high transparency, and good tenacity, and are obviously superior to general monomer amine curing agents.

Figure 3:
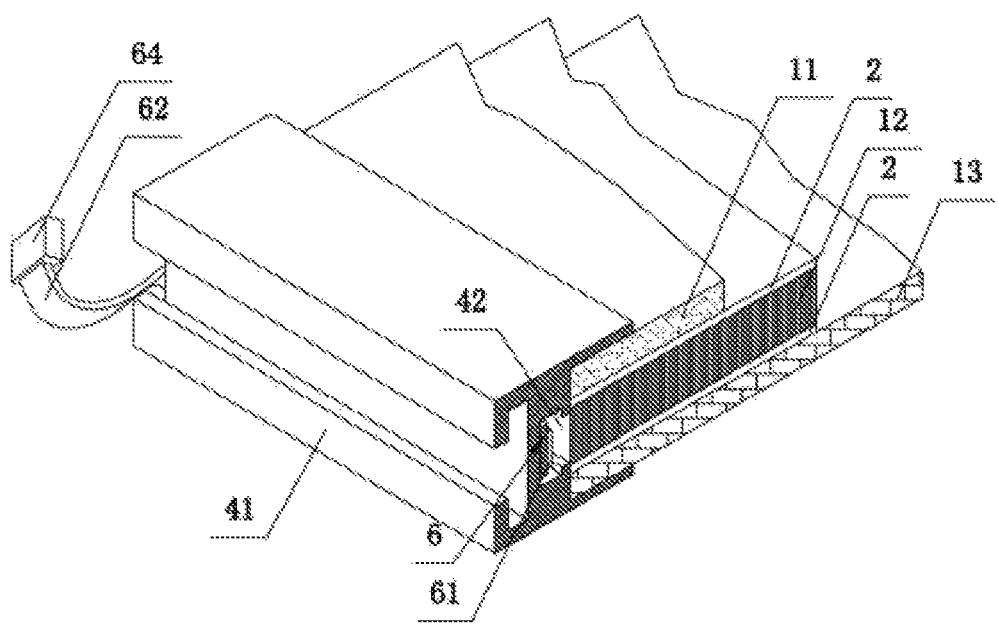
FIG. 3 is a schematic view of a cross-sectional structure of the present invention.
Figure 4:
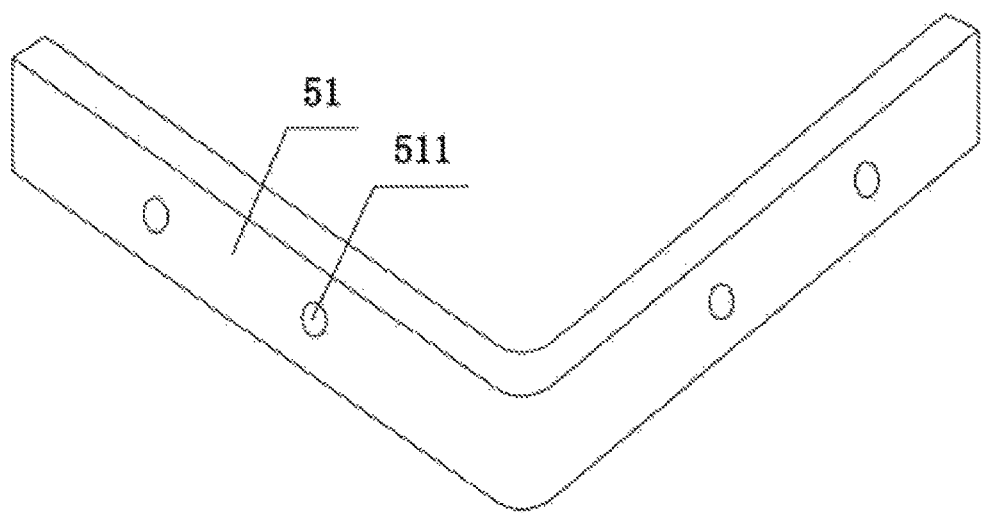
FIG. 4 is a schematic view of a structure of a connecting assembly in the present invention.
Figure 5:
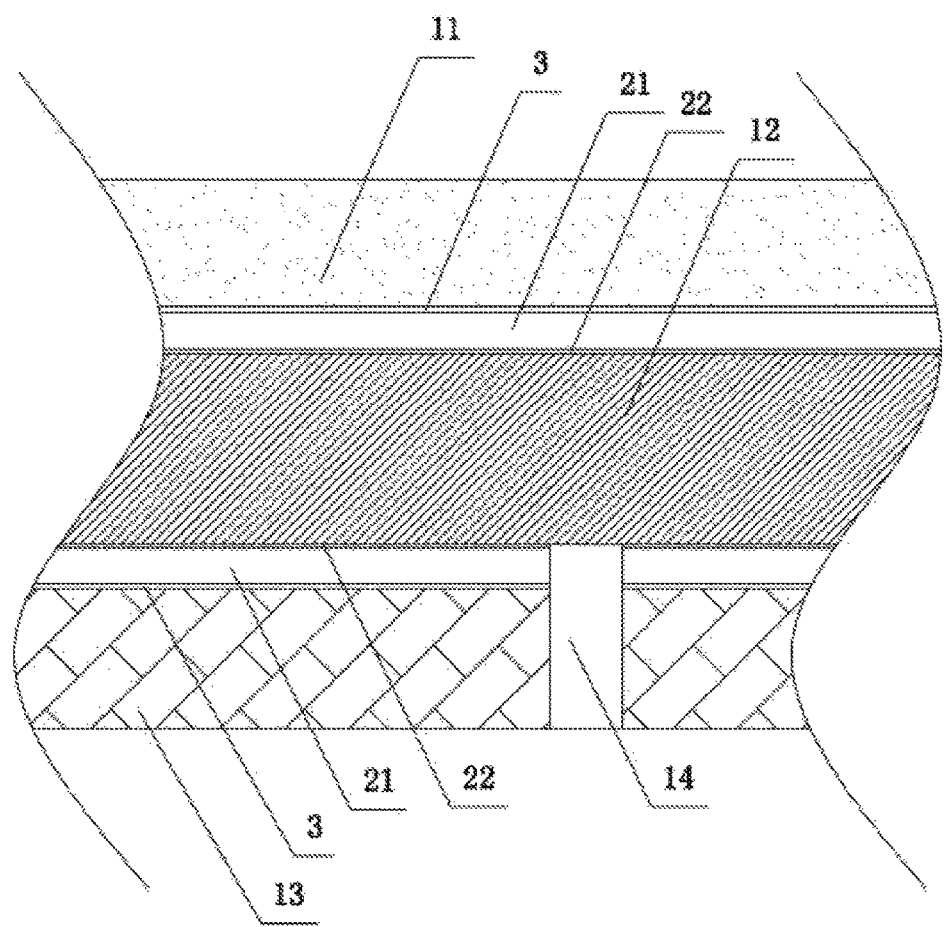
FIG. 5 is a cross-sectional view of a composite plate in the present invention.

Referring to FIG. 3 and FIG. 5, preferably, the water-molecule-activated protective film 2 includes a PET film 21 and a water-molecule-activated adhesive 22, and the PET film 21 is bonded to the light guide plate 12 by using the water-molecule-activated adhesive 22. The water-molecule-activated adhesive 22 is also known as a polyurethane adhesive. When used for bonding, the polyurethane adhesive does not immediately have high adhesive strength, and needs to be cured. Curing is a process of changing a liquid adhesive to a solid substance. The curing process also includes post curing, that is, reactive perssads in the adhesive after preliminary curing further react or generate crystals, and final curing strength is obtained. For the polyurethane adhesive, the curing process is a process of causing NCO perssads in the adhesive to react completely, or causing a solvent to volatilize completely or a polyurethane molecular chain to crystallize, so that the adhesive and a substrate produce sufficiently high adhesive strength. During use, a side for bonding the PET film to the light guide plate is coated with a solid water-molecule-activated adhesive. Then the solid water-molecule-activated adhesive is activated by water, and the light guide plate is covered with the adhesive. After water in the water-molecule-activated adhesive evaporates, sufficiently high adhesive strength can be formed, so that the PET film is bonded to the light guide plate.

Referring to FIG. 1, FIG. 2, FIG. 3, FIG. 4, and FIG. 5, a concave installation housing 4 is clamped to each lateral side of the composite plate 1, and every two adjacent concave installation housings 4 are fixed by using a connecting assembly 5. The connecting assembly 5 includes two integrated fixing plates 51, a bending angle exists between the two fixing plates 51, there are screw holes 511 on the two fixing plates, and the two fixing plates are respectively locked to two adjacent concave installation housings 4 by using bolts. Two ears 41 disposed opposite to each other are provided on one side of the concave installation housing 4 away from the composite plate 1, and the fixing plate 51 capable of sliding is embedded between the concave installation housing 4 and the ears 41. The connecting assembly 5 is disposed to fix two adjacent concave installation housings 4, so that stability of an overall structure of the present invention is improved. In addition, the ears 41 disposed opposite to each other on the concave installation housing 4 can guide the fixing plate 51 and facilitate dismounting, and can further improve the stability of the overall structure. In this embodiment, the composite plate is in a square shape. Therefore, a bending angle between the two fixing plates is set to 90° approximately.

Referring to FIG. 1, FIG. 2, FIG. 3, FIG. 4, and FIG. 5, the light guide plate 12 is a 1.8 m×3.0 m special fiberglass light guide plate. A size of the special fiberglass light guide plate used in the present invention is greater than 1.2 m×2.4 m generally used in the market. This can facilitate later processing and cutting according to a user requirement.

Referring to FIG. 1, FIG. 2, FIG. 3, FIG. 4, and FIG. 5, a strip slot 42 is provided on an internal surface of one side of the concave installation housing 4 facing the composite plate 1, an LED strip 6 capable of emitting light into the light guide plate 12 is installed in the strip slot 42, and the LED strip 6 is electrically connected to a 12V or 24V rechargeable lithium battery (not shown in the drawings). A charging interface is available on the lithium battery. LEDs 61 installed in the LED strip 6 may be RGB color surface-mounted LEDs whose colors can be adjusted, or may be single-color surface-mounted LEDs. Flat cables 62 of two adjacent LED strips 6 may extend out of the concave installation housings 4 through notches 43 on the concave installation housings 4, and are connected to each other by using a male connector 63 and a female connector 64.

In addition, the stone panel is a mosaic combination of more than one or two of natural granite, marble, sandstone, semi-precious stone, and quartzite. The honeycomb plate is an aluminum product, a PVC product, or an acrylic product. The stone slab in the present invention may be applied to a scenario in which a light transmission effect of a stone material needs to be demonstrated, for example, a natural furniture panel, a background wall, a suspended ceiling, and ground. It is extensively applied, and has great market prospects. If the stone slab is installed on the background wall, a socket may be disposed during installation, and this does not impair an ambient lighting effect.

Referring to FIG. 1, FIG. 2, FIG. 3, FIG. 4, and FIG. 5, a process for manufacturing a stone slab with a light source includes the following steps:

Step 1

Synthesis of a composite plate 1: Fetch a light guide plate 12, and bond a water-molecule-activated protective film 2 to an upper surface and a lower surface of the light guide plate 12 in a water-molecule-activated manner respectively; fetch a stone panel 11, and bond the stone panel 11 to the water-molecule-activated protective film on the upper surface of the light guide plate 12 by using an adhesive 3; and fetch a honeycomb plate 13, and bond the honeycomb plate 13 to the water-molecule-activated protective film on the lower surface of the light guide plate 12 by using an adhesive 3.

Step 2

Polish a surface of the stone panel 11 in the composite plate 1 by using a stone mill with automatic pneumatic pressure control.

Step 3

Polish edges of the light guide plate 12 in the composite plate 1 by using a dedicated polishing machine, until the edges are transparent, so that light emitted by an LED strip 6 can be transparently transmitted.

Step 4

Clamp a concave installation housing 4 to each lateral side of the composite plate 1, and install an LED strip 6 and a rechargeable lithium battery electrically connected to the LED strip 6 in a strip slot 42 that is provided on an internal surface of one side of the concave installation housing 4 facing the composite plate 1.

Step 5

Fixedly connect every two adjacent concave installation housings 4 by using a connecting assembly 5, which includes inserting one fixing plate 51 of the connecting assembly 5 between one concave installation housing 4 and ears 41, then sleeving the other fixing plate 51 of the connecting assembly 5 with another adjacent concave installation housing, and finally locking the fixing plates by using bolts.

Step 6

Perform drilling from a lower surface of the composite plate 1 by using an alloy bit, penetrate the honeycomb plate 13 and the water-molecule-activated protective film 2 in sequence, and reach the light guide plate 12 to form an embedded hole 14; and then embed a back-bolt expansion screw in the embedded hole, and mount an ear assembly onto the back-bolt expansion screw.

In the manufacturing process, operations are simple, the finished stone slab has a stable structure and has strong durability. In addition, in comparison with the prior art, a light guide effect is greatly improved.

Only specific embodiments of the present invention are described above. However, the design conception of the present invention is not limited thereto. All non-substantive modifications made to the present invention by using the conception shall be deemed as actions that infringe the protection scope of the present invention.

What is claimed is:

1. A stone slab with a light source, comprising a transparent composite plate;
   wherein the composite plate comprises a stone panel, a light guide plate, and a honeycomb plate that are laminated from top to bottom; a water-molecule-activated protective film is provided on an upper surface and a lower surface of the light guide plate respectively, the water-molecule-activated protective film on the upper surface of the light guide plate is bonded to the stone panel by using an adhesive, and the water-molecule-activated protective film on the lower surface of the light guide plate is bonded to the honeycomb plate by using an adhesive; the water-molecule-activated protective film comprises a PET film and a water-molecule-activated adhesive, and the PET film is bonded to the light guide plate by using the water-molecule-activated adhesive.

2. The stone slab with a light source according to claim 1, wherein a concave installation housing is clamped to each lateral side of the composite plate, and every two adjacent concave installation housings are fixed by using a connecting assembly.

3. The stone slab with a light source according to claim 2, wherein the connecting assembly comprises two integrated fixing plates, a bending angle exists between the two fixing plates, and the two fixing plates are respectively locked to two adjacent concave installation housings by using bolts.

4. The stone slab with a light source according to claim 3, wherein two ears disposed opposite to each other are provided on one side of the concave installation housing away from the composite plate, and the fixing plate is slidably embedded between the concave installation housing and the ears.

5. The stone slab with a light source according to claim 1, wherein the light guide plate is a 1.8 m×3.0 m special fiberglass light guide plate.

6. The stone slab with a light source according to claim 1, wherein a strip slot is provided on an internal surface of one side of the concave installation housing facing the composite plate, an LED strip capable of emitting light into the light guide plate is installed in the strip slot, and the LED strip is electrically connected to a 12V or 24V rechargeable lithium battery.

7. The stone slab with a light source according to claim 1, wherein the stone panel is a mosaic combination of more than one or two of natural granite, marble, sandstone, semi-precious stone, and quartzite.

8. The stone slab with a light source according to claim 1, wherein the honeycomb plate is an aluminum product, a PVC product, or an acrylic product.

9. A process for manufacturing a stone slab with a light source, comprising the following steps:
   (1) synthesis of a composite plate: fetching a light guide plate, and bonding a water-molecule-activated protective film to an upper surface and a lower surface of the light guide plate in a water-molecule-activated manner respectively; fetching a stone panel, and bonding the stone panel to the water-molecule-activated protective film on the upper surface of the light guide plate by using an adhesive; and fetching a honeycomb plate, and bonding the honeycomb plate to the water-molecule-activated protective film on the lower surface of the light guide plate by using an adhesive;

(2) polishing a surface of the stone panel in the composite plate by using a stone mill with automatic pneumatic pressure control;

(3) polishing edges of the light guide plate in the composite plate by using a dedicated polishing machine, until the edges are transparent;

(4) clamping a concave installation housing to each lateral side of the composite plate, and installing an LED strip and a rechargeable lithium battery electrically connected to the LED strip in a strip slot that is provided on an internal surface of one side of the concave installation housing facing the composite plate;

(5) fixedly connecting every two adjacent concave installation housings by using a connecting assembly; and (6) performing drilling from a lower surface of the composite plate by using an alloy bit, penetrating the honeycomb plate and the water-molecule-activated protective film in sequence, and reaching the light guide plate to form an embedded hole; and then embedding a back-bolt expansion screw in the embedded hole, and mounting an ear assembly onto the back-bolt expansion screw.

* * * * *